United States Patent
Haro et al.

(10) Patent No.: US 11,028,244 B2
(45) Date of Patent: Jun. 8, 2021

(54) PREPREG, LAMINATE BODY, FIBER REINFORCED COMPOSITE MATERIAL, AND MANUFACTURING METHOD FOR FIBER REINFORCED COMPOSITE MATERIAL

(71) Applicant: TORAY INDUSTRIES, INC., Tokyo (JP)

(72) Inventors: Alfred P. Haro, Tacoma, WA (US); Nobuyuki Arai, Tacoma, WA (US)

(73) Assignee: TORAY INDUSTRIES, INC., Tokyo (JP)

( * ) Notice: Subject to any disclaimer, the term of this patent is extended or adjusted under 35 U.S.C. 154(b) by 64 days.

(21) Appl. No.: 15/778,563

(22) PCT Filed: Dec. 14, 2016

(86) PCT No.: PCT/IB2016/001872
§ 371 (c)(1),
(2) Date: May 23, 2018

(87) PCT Pub. No.: WO2017/103669
PCT Pub. Date: Jun. 22, 2017

(65) Prior Publication Data
US 2018/0355132 A1  Dec. 13, 2018

Related U.S. Application Data

(60) Provisional application No. 62/268,311, filed on Dec. 16, 2015, provisional application No. 62/403,948, filed on Oct. 4, 2016.

(51) Int. Cl.
| | | |
|---|---|---|
| C08J 5/24 | (2006.01) | |
| C08J 5/04 | (2006.01) | |
| B29B 11/16 | (2006.01) | |
| B32B 5/02 | (2006.01) | |
| B32B 5/12 | (2006.01) | |

(Continued)

(52) U.S. Cl.
CPC .............. C08J 5/24 (2013.01); B29B 11/16 (2013.01); B32B 5/024 (2013.01); B32B 5/12 (2013.01);
(Continued)

(58) Field of Classification Search
CPC . B32B 2038/0076; B32B 37/26; B32B 38/00; B32B 5/024; B32B 5/12;
(Continued)

(56) References Cited

U.S. PATENT DOCUMENTS

| | | |
|---|---|---|
| 6,139,942 A | 10/2000 | Hartness et al. |
| 2006/0035548 A1 | 2/2006 | Goto et al. |

(Continued)

FOREIGN PATENT DOCUMENTS

| | | |
|---|---|---|
| EP | 3225652 A1 | 10/2017 |
| EP | 3476886 A1 | 5/2019 |

(Continued)

OTHER PUBLICATIONS

Sumitomo Expands Epoxy, PES Offerings for Carbon-Fiber Reinforced Composites, accessed online Aug. 21, 2020.*

(Continued)

*Primary Examiner* — Camie S Thompson
(74) *Attorney, Agent, or Firm* — RatnerPrestia (57) ABSTRACT

A permeable laminate body containing at least one partially impregnated prepreg which includes at least component (A) containing a matrix of reinforcing fiber, component (B) containing a thermosetting resin, and, optionally, component (C) containing a particle or a fiber of a thermoplastic resin exhibits long out time processability with good storage stability, achieving when molded and cured a fiber reinforced composite having a low void ratio and providing excellent mechanical performance.

28 Claims, 3 Drawing Sheets

Explanation of reference
1: Reinforcing fiber
2: Thermosetting resin
3: Reinforcing fiber layer(Intralayer)
4: Thermoplastic resin particle
5: Interlayer molded layer(Interlayer)
6: Unimpregnated layer (51) Int. Cl.
  *B29K 63/00* (2006.01)
  *B29K 307/04* (2006.01)
(52) U.S. Cl.
  CPC .............. *C08J 5/04* (2013.01); *C08J 5/042* (2013.01); *B29K 2063/00* (2013.01); *B29K 2307/04* (2013.01); *B32B 2260/023* (2013.01); *B32B 2260/046* (2013.01); *C08J 2363/00* (2013.01); *C08J 2481/06* (2013.01)
(58) Field of Classification Search
  CPC ........ B32B 2260/023; B32B 2260/046; B32B 27/06; B32B 28/00; C08J 2363/00; C08J 5/04; C08J 5/24; C08J 2481/06; Y10T 428/24372; Y10T 428/24405; Y10T 428/24893; B29B 11/16; B29K 2063/00; B29K 2307/04
  USPC .......................... 156/286; 428/143, 147, 206
  See application file for complete search history.

(56) References Cited

U.S. PATENT DOCUMENTS

| | | |
|---|---|---|
| 2014/0013826 A1 | 1/2014 | Liu et al. |
| 2014/0087178 A1 | 3/2014 | Arai et al. |
| 2014/0309336 A1 | 10/2014 | Hughes et al. |

FOREIGN PATENT DOCUMENTS

| | | |
|---|---|---|
| JP | 01104624 A | 4/1989 |
| JP | 2005298713 A | 10/2005 |
| JP | 2007098818 A | 4/2007 |
| JP | 2008088276 A | 4/2008 |
| JP | 2009108217 A | 5/2009 |
| WO | 0100405 A2 | 1/2001 |
| WO | 2012064662 A1 | 5/2012 |
| WO | 2013096968 A2 | 6/2013 |

OTHER PUBLICATIONS

Hsiao, K., "Gas Transport and Water Vapourization in Out-of-Autoclave Prepeg Laminates", Thesis and Dissertation, the University of British Columbia, Jul. 6, 2012, pp. 36-48.
International Search Report and Written Opinion for International Application No. PCT/IB2016/001872, dated Apr. 18, 2017—6 pages.
Kay et al., "Gas Transport and Void Formation in Out-of-Autoclave Prepegs", Composite Research Network, Aug. 31, 2014—1 page.
International Preliminary Report on Patentability for International Application No. PCT/IB2013/001872, dated Jun. 19, 2018, 5 pages.
European Communication for European Application No. 16874976,0, dated Jul. 10, 2019, 4 pages.

* cited by examiner

FIG. 1

Explanation of reference
1: Reinforcing fiber
2: Thermosetting resin
3: Reinforcing fiber layer(Intralayer)
4: Thermoplastic resin particle
5: Interlayer molded layer(Interlayer)
6: Unimpregnated layer

FIG. 2

Explanation of reference
1 : Reinforcing fiber
2 : Thermosetting resin
3 : Reinforcing fiber layer (Intralayer)
4 : Thermoplastic resin particle
5 : Interlayer molded layer (Interlayer)
6 : Unimpregnated layer

FIG. 3

PREPREG, LAMINATE BODY, FIBER REINFORCED COMPOSITE MATERIAL, AND MANUFACTURING METHOD FOR FIBER REINFORCED COMPOSITE MATERIAL

CROSS-REFERENCE TO RELATED APPLICATIONS

This application is the U.S. National Phase application of PCT/IB2016/001872, filed Dec. 14, 2016, which claims priority from U.S. Provisional Application No. 62/268,311, filed 16 Dec. 2015, and U.S. Provisional Application No. 62/403,948, filed 4 Oct. 2016. The disclosure of each of these applications is incorporated herein by reference in its entirety for all purposes.

TECHNICAL FIELD OF THE INVENTION

The present invention relates to prepregs, laminate bodies comprised of such prepregs, fiber reinforced composite materials prepared from such laminate bodies, and manufacturing methods for such fiber reinforced composite materials.

BACKGROUND OF THE INVENTION

Fiber reinforced composite materials are widely used in industry, including aerospace and spacecraft components which require particularly excellent structural mechanical properties as well as heat resistance. Traditionally, one of the preferred molding methods utilizes an autoclave creating high compaction pressures to consolidate, for example, large and complex structures to achieve the absence of voids in the cured material, thereby producing a rigid, light weight, and robust composite. On the other hand, these autoclave methods have high operating and capital costs and can restrict the molding size possibly due to equipment capacity, thereby encouraging the development of alternative molding methods.

Molding methods such as Out-Of-Autoclave (OOA) processes have been developed which rely on vacuum only methods, which apply much lower compaction pressures. OOA processes have demonstrated potential capital cost reductions and permit expanded molding size, yet these processes have difficulty achieving consistent void-free composites when venturing into large and complex structures, due to the lack of high compaction pressures such as those used in an autoclave. Additionally, OOA processing is suitable for fiber reinforced composite components manufactured using fibers that are pre-impregnated with a matrix resin, also known as prepregs. To form a composite part from the prepregs for instance in large and complex structures, one or more layers of prepregs are assembled within a mold by meticulous hand layup, which could take weeks at a time. Heat is applied to the assembly of prepregs to cause the matrix resin to flow, enabling consolidation of the prepreg layers to produce the final composite.

However, it would be desirable to develop improved prepregs which are suitable for use in OOA processes.

SUMMARY OF THE INVENTION

Since OOA processes rely on voids being removed by vacuum only, prepregs can be engineered having partial impregnation between the resin layer and fiber layer to facilitate the removal of voids from the prepreg stack during consolidation in an OOA process. Such partial impregnation could be controlled such that the prepreg stack is permeable, thereby providing one or more pathways generally in the plane of the prepreg stack through which gases or volatiles can escape during curing.

In particular, it would be advantageous if a prepreg stack (also referred to as a "laminate body") intended for use in an OOA molding process is capable of maintaining sufficient permeability over an extended period of out-time at room temperature. The present inventors have discovered that it is desirable for the laminate body to be able to maintain at least a minimum permeability, such as a minimum permeability of 4.0E-14 $m^2$, at room temperature (23° C.) for up to 20 days or more, this being the estimated time to prepare large and complex structures by manual hand layup.

At the same time, however, it is also desirable that the laminate body is capable of providing, after curing, a fiber reinforced composite material that is substantially or entirely free of voids. Voids could be introduced within the composite by several sources: air entrapment during material handling, volatiles in the resin matrix, environmental effects such as relative humidity which can affect the moisture content of the prepreg, and/or moisture absorption during in and out of storage uses, which makes storage stability also an essential factor. Furthermore, such moisture effects could potentially be induced by long out times at room temperature along with storage conditions which could contribute to premature closing of the engineered air paths by reducing the resin viscosity in the partially impregnated prepreg, allowing the resin to flow in the air path restricting its permeability level and resulting in a poor quality composite when cured.

Overcoming these issues for practical use of OOA prepregs has proven to be challenging, especially for large and complex structures. This is because measures intended to keep the engineered air paths open during extended out time at room temperature may interfere with the ability to remove all or essentially all voids during curing of a laminate body containing prepregs.

As a result of diligent research into characterizing the effects of prepreg out-time and storage stability on the permeability of OOA prepregs, the present inventors have discovered a prepreg that when incorporated into a laminate body can promote long out-times with good storage stability suitable for out-of-autoclave processing, producing a high quality component having excellent mechanical performance and an exceptionally low void ratio.

The present invention thus provides a laminate body comprised of partially impregnated prepregs promoting longer out time processability by maintaining air passages for entrapped air and/or volatiles to be removed from the laminate body under vacuum during cure to achieve a void-free, fiber reinforced composite article. The laminate body could further comprise an interlayer toughening layer for enhanced mechanical performance. Furthermore, the laminate body could be molded by an out-of-autoclave (OOA) process and/or an autoclave.

In one embodiment, the invention provides a partially impregnated prepreg comprised of a component (A) comprising a matrix of reinforcing fiber and a component (B) comprising a thermosetting resin, wherein i) the matrix of reinforcing fiber is partially impregnated by component (B) and (ii) the prepreg, when laid up in multiple plies after an out time of 20 days at 23° C., provides a laminate body having a permeability of at least 4.0E-14 $m^2$ and having a void ratio after cure of <1%.

In a second embodiment, after 20 days out time at 23° C. the laminate body has a permeability of not greater than 1.0E-13 m².

In a third embodiment, the laminate body satisfies the following condition:

$$P_{0day} - P_{20day} \text{ at 24 hr vacuum is } \leq 1.0E\text{-}14 \text{ m}^2$$

wherein $P_{0day}$ is the permeability parameter of 0 day out time prepreg at 24 hr vacuum, and wherein $P_{20day}$ is the permeability parameter of 20 day out time prepreg at 24 hr vacuum, wherein the permeability difference of $P_{0day} - P_{20day}$ is ≤1.0E-14 m². In this embodiment, "out time prepreg" means the duration of time the plies of partially impregnated prepreg used in a laminate body have been at room temperature (23° C.), either before or after incorporation into the laminate body, prior to the laminate body being cured. In other embodiments, the components and conditions used to fabricate the prepreg are selected such that a laminate body formed from multiple plies of the prepreg exhibits little or no change in permeability between 0 day out time and 20 days out time at room temperature, e.g., less than 30% change, less than 25% change, less than 20% change, less than 15% change, less than 10% change or even less than 5% change.

In a fourth embodiment, component (B) has a viscosity at 30° C. of between about 20,000 and 140,000 Pa·s and a minimum viscosity of between about 0.1 and about 15 Pa·s.

In a fifth embodiment, component (B) is additionally comprised of at least one thermoplastic resin dissolved in the thermosetting resin selected from the group consisting of polyvinyl formals, polyamides, polycarbonates, polyacetals, polyvinylacetals, polyphenyleneoxides, polyphenylenesulfides, polyarylates, polyesters, polyamideimides, polyimides, polyetherimides, polysulfones, polyethersulfones, polyetherketones, polyetheretherketones, polyaramids, polyethernitriles, polybenzimidazoles, derivatives thereof, and combinations thereof.

In a sixth embodiment, at least one thermoplastic resin has a number average molecular weight in the range of from about 10,000 to about 70,000.

In a seventh embodiment, the thermoplastic resin of component (B) is present in component (B) in an amount which is 5-30 weight parts per 100 weight parts of the thermosetting resin.

In an eighth embodiment, the thermosetting resin includes at least one type of epoxy resin selected from the group consisting of solid bisphenol A epoxy resins, a solid bisphenol F epoxy resins, and novolac epoxy resins, and combinations thereof.

In a ninth embodiment, the epoxy resin or combination of epoxy resins selected from the above-mentioned group has an EEW in the range of about 100 to about 800.

In a tenth embodiment, the epoxy resin or combination of epoxy resins selected from the above-mentioned group has a softening point in the range of about 50° C. to about 125° C.

In an eleventh embodiment, the epoxy resin or combination of epoxy resins selected from the above-mentioned group is present in an amount which is 5-40 weight parts per 100 weight parts of the thermosetting resin.

In a twelfth embodiment, the prepreg is additionally comprised of a component (C) comprising a particle and/or fiber of thermoplastic resin.

In a thirteenth embodiment, the particle and/or fiber of thermoplastic resin of component (C) is present in an amount of about 6 wt % to about 20 wt % based on the weight of thermosetting resin.

In a fourteenth embodiment, components (B) and (C) together represent from about 32% to about 45% of the total weight of the laminate body.

In a fifteenth embodiment, the component (C) is substantially locally distributed on or near a surface of the prepreg.

In a sixteenth embodiment, the prepreg comprises a first layer comprised of a portion of the thermosetting resin and a second layer comprised of a reinforcing fiber layer comprising the matrix of reinforcing fiber.

In a seventeenth embodiment, the first layer is at or near a surface of the prepreg up to a depth of 20% from the surface.

In a eighteenth embodiment, only one side of the prepreg is covered substantially by component (B).

In an nineteenth embodiment, both sides of the prepreg are covered substantially by component (B).

In a twentieth embodiment, the invention provides a laminate body comprised of a plurality of partially impregnated prepregs in accordance with any of the above-mentioned embodiments.

In a twenty-first embodiment, the invention provides a fiber reinforced composite material comprising at least one laminate body in accordance with any one of the above-mentioned embodiments, wherein the laminate body has been thermally cured.

In a twenty-second embodiment, the invention provides a fiber reinforced composite material comprising at least one laminate body in accordance with any one of the above-mentioned embodiments, wherein the matrix of reinforcing fiber is unidirectional or has a fabric weave structure.

In a twenty-third embodiment, the void ratio of the fiber reinforced composite material is <1% after the cure cycle.

In a twenty-fourth embodiment, the invention provides a method for manufacturing a fiber reinforced composite material, comprising molding a laminate body in accordance with any of the above-mentioned embodiments using a vacuum pump and oven.

In a twenty-fifth embodiment, the invention provides a process for making a partially impregnated prepreg, comprising partially impregnating a component (A) comprising a matrix of reinforcing fiber with a component (B) comprising a thermosetting resin to form a partially impregnated prepreg, wherein component (B) is selected to have viscosity characteristics such that when the prepreg is laid up in multiple plies after an out time of 20 days at 23° C. to form a laminate body, the laminate body has a permeability of at least 4.0E-14 m² and the void ratio of the laminate body after cure is <1%.

In a twenty-sixth embodiment, the invention provides a partially impregnated prepreg, comprising a component (A) comprising a matrix of reinforcing fiber and a component (B) comprising a thermosetting resin, wherein component (A) is partially impregnated by component (B) and wherein component (B) comprises an amount of one or more epoxy resins which are solid at 30° C. and/or an amount of at least one thermoplastic resin dissolved in the thermosetting resin which is or are effective to impart to component (B) a viscosity at 30° C. of between about 20,000 and 140,000 Pa·s and a minimum viscosity of between about 0.1 and about 15 Pa·s.

In a twenty-seventh embodiment, the invention provides a process for making a fiber reinforced composite material, comprising the steps of a) laying up a plurality of plies of prepreg to obtain a laminate body and b) curing the laminate body to obtain the fiber reinforced composite material, wherein the prepreg comprises a partially impregnated prepreg comprised of a component (A) comprising a matrix of reinforcing fiber and a component (B) comprising a thermosetting resin, wherein i) the matrix of reinforcing fiber is partially impregnated by component (B) and ii) the partially impregnated prepreg, when laid up in multiple plies after an out time of 20 days at 23° C., provides a test laminate body having a permeability of at least 4.0E-14 m$^2$ and a void ratio after cure of <1%. The partially impregnated prepreg may be any of the embodiments of partially impregnated prepreg mentioned above. The individual plies of the laminate body may each be a partially impregnated prepreg in accordance with any of the embodiments of the invention. In other embodiments of the invention, fewer than all of the individual plies of the laminate body are partially impregnated prepregs in accordance with embodiments of the invention, provided that at least one ply is a partially impregnated prepreg in accordance with an embodiment of the invention.

In a twenty-eight embodiment, the invention provides a process for making a fiber reinforced composite material, the process comprising:
  i) forming a laminate body having a permeability of at least 4.0E-14 m$^2$ after an out time of 20 days at 23° C. by laying up a plurality of plies of prepreg, each ply comprising a partially impregnated prepreg comprised of a component (A) including a matrix of reinforcing fiber and a component (B) including a thermosetting resin, wherein the matrix of reinforcing fiber is partially impregnated by component (B); and
  ii) curing the laminate body to obtain a fiber reinforced composite material having a void ratio after cure of <1%.

DETAILED DESCRIPTION OF CERTAIN EMBODIMENTS OF THE INVENTION

Although the invention is illustrated and described herein with reference to specific embodiments, the invention is not intended to be limited to the details shown. Rather, various modifications may be made in the details within the scope and range of equivalents of the claims and without departing from the invention.

The terms "approximately" and "about" as used herein represent an amount close to the stated amount that still performs the desired function or achieves the desired result. The term "room temperature" as used herein means 23° C., unless the context indicates otherwise.

Herein, "prepreg" refers to a molding intermediate substrate where a matrix (e.g., a layer) of reinforcing fiber is impregnated with a matrix resin. In the present invention, a thermosetting resin composition containing (B) thermosetting resin and, optionally, (C) particles or fiber of thermoplastic resin is used as the matrix resin. Other components may also be present in the thermosetting resin composition including, for example, one or more hardeners. The thermosetting resin is in an uncured condition in the prepreg, and a fiber reinforced composite material can be obtained by laying up the prepreg (stacking up multiple layers of prepreg to form a laminate body) and curing. Naturally, a fiber reinforced composite material can be obtained by curing a single layer of prepreg. When a fiber reinforced composite material is made by laying up a plurality of prepreg layers and curing the resulting laminate body, the surface part of the prepreg layers becomes an interlayer molded layer containing (B) and optionally also component (C), formed on the layer of the reinforcing fibers which is preferably up to a depth of about 20% from the surface, and the inside of the prepreg becomes a reinforcing fiber layer of the fiber reinforced composite material. Furthermore, in one embodiment of the invention only one side of the prepreg is covered substantially by the thermosetting resin composition component (B), which optionally is combined with component (C).

In certain embodiments of the invention, the prepreg is in the form of a sheet having a thickness of 0.005 inches to 0.011 inches (0.13 mm to 0.28 mm). A laminate body containing plies of prepreg in accordance with the present invention may contain two or more prepreg plies, for example 2-30 plies or 4 to 20 plies.

The term "permeability" as used herein means the permeability parameter as measured by the method described in the Examples.

With the prepreg of the present invention, the component (C) particles and/or fibers of thermoplastic resin are locally provided on the surface part of the prepreg. In other words, a layer with an abundance of the aforementioned particles and/or fibers may be present on at least one surface of the prepreg, where the particles or fibers of component (C) can clearly be identified to exist locally when the prepreg is observed in cross section. This layer is hereinafter also referred to as an interlayer molding layer, as it is present between adjacent layers of prepreg in the laminate body and in the fiber reinforced composite material obtained by curing and molding the laminate body. Thereby, if the prepreg is overlaid and the matrix resin is cured to form a fiber reinforced composite material, an interlayer is formed where the aforementioned particles and/or fibers of component (C) exist locally between the reinforcing fiber layers. This feature serves to increase the toughness between the reinforcing fiber layers, and the fiber reinforced composite material obtained will have a high degree of impact resistance.

Figure 1:
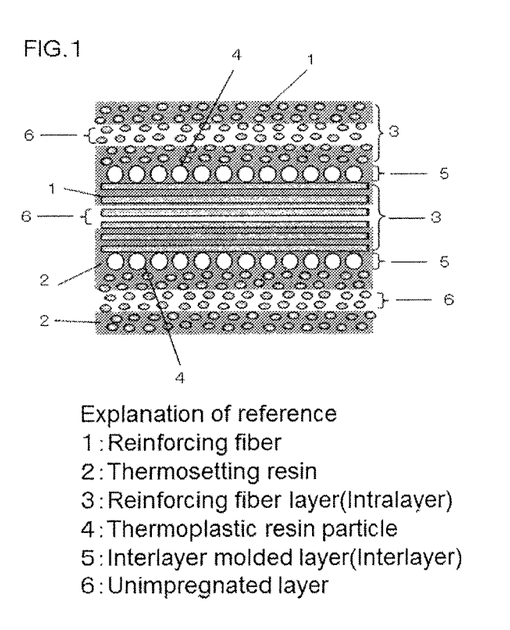
FIG. 1 shows a cross-section view of an example of a laminate body of the present invention comprised of partially impregnated prepregs.

FIG. 1 shows an example of a cross-section view of a typical laminate body as may be fabricated using prepreg in accordance with the present invention. In particular, FIG. 1 shows, in cross section, an example of a laminate body before cure, consisting of three layers (plies) of partially impregnated prepreg. Component (A) comprises reinforcing fibers (1) and Component (B) comprises thermosetting resin composition (2). The interlayer molded layer (5) comprising Component (C), containing thermoplastic resin particles (4), is positioned between the layers. The unimpregnated layer of reinforcing fibers (6) provides permeable pathways within the laminate body (including within reinforcing fiber layers/intralayers (3)), through which gases and volatiles can escape during consolidation and curing of the laminate body.

The prepreg, in one embodiment of the present invention, is a partially impregnated prepreg, comprising component (A) comprising a matrix of reinforcing fiber, component (B) is a thermosetting resin composition comprising a thermosetting resin (and possibly one or more other substances), and, optionally, component (C) comprising particles and/or fibers of thermoplastic resin (not dissolved in component (B)), wherein in one embodiment a weight fraction of components (B) and (C) in total is preferably from about 32% to about 45% and more preferably between 35% and 40% of the total weight of the prepreg. Furthermore, as mentioned previously component (C) may be substantially locally distributed on or near a surface of the prepreg. If the weight fraction of thermosetting resin composition is too low, the flow of the matrix resin in the prepreg will not completely wet out the unimpregnated matrix (e.g., layer) of reinforcing fiber during curing, causing many voids in the fiber reinforced composite material obtained. If the fraction of the thermosetting resin composition is too high, a fiber reinforced composite material having excellent specific strength and specific modulus may not be obtained.

Figure 2:
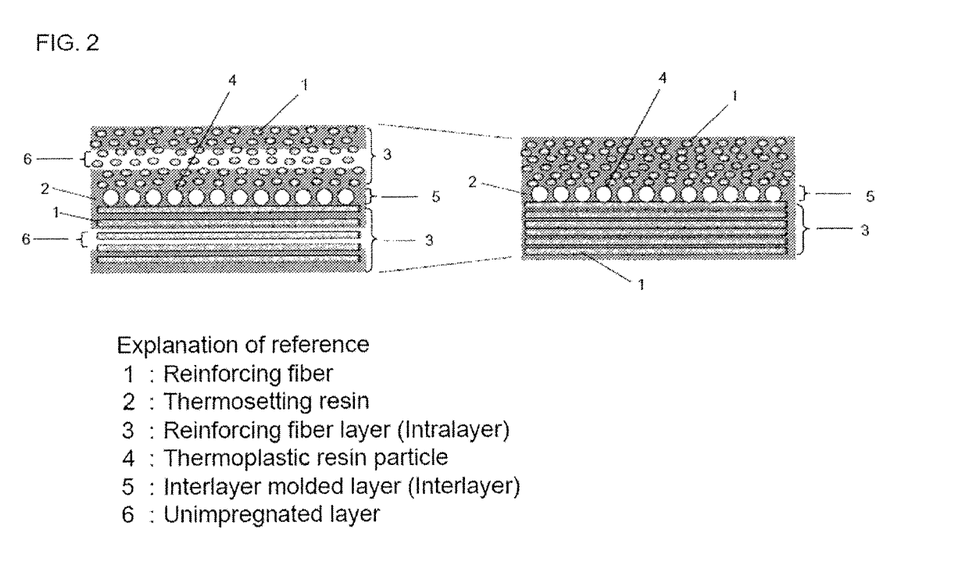
FIG. 2 is a schematic of an embodiment of a consolidation process for an exemplary laminate body in accordance with the present invention, showing the exemplary laminate body before and after cure.

The consolidation process for two plies of partially impregnated prepreg in accordance with one embodiment of the present invention may be described by reference to FIG. 2. FIG. 2 is a schematic of the consolidation process for two plies of prepreg (together comprising a permeable laminate body), showing (on the left side of FIG. 2) the laminate body before cure (when it is permeable) and (on the right side of FIG. 2) after cure (when it has been converted to a fiber reinforced composite material having a favorably low void ratio). The laminate body on the left side of FIG. 2 shows a similar configuration to FIG. 1 before cure. After cure (as illustrated on the right side of FIG. 2), the reinforcing fiber layer or intralayer (3) is completely formed within the laminate body and the interlayer molded layer (5) is further distinguishable between two layers in the laminate body. Additionally, unimpregnated layers (6) have been eliminated as a result of the further penetration of thermosetting resin composition (2) into the reinforcing fiber layers (3). Unimpregnated layers (6) function as gas permeable pathways through the laminate body, thereby facilitating the escape of gases and volatiles within the laminate body that might otherwise become entrapped in the laminate body during curing of the thermosetting resin composition (2), thereby creating undesirable voids in the resulting fiber reinforced composite material made from the laminate body.

The prepreg, in one embodiment of the present invention, has an unimpregnated layer (6). During curing of the prepreg, the thermosetting resin composition (2) impregnates the unimpregnated layer (6). At the same time, the density of the prepreg is increased as a result of the air space within the unimpregnated layer (6) being replaced by thermosetting resin composition (2). The portions of thermosetting resin composition which had been separated from each other on either side of the unimpregnated layer may be regarded as becoming integrated with each other during curing so as to form a continuous resin matrix in the fiber reinforced composite material thereby obtained. In the present invention, this series of processes is defined as the consolidation process. In order to achieve low voids in the fiber reinforced composite material obtained, the aforementioned consolidation process is completed during curing of the prepreg. Furthermore, as one step of the consolidation process, air that is trapped during layup and volatile components from the prepreg are released out of the prepreg during the consolidation process. With the prepreg of the present invention, the weight fraction of the thermosetting resin in the interlayer molded layer (5) is selected by controlling the resin impregnation to a high degree, and the flow of the matrix resin during prepreg curing, and particularly the flow of the matrix resin in the interlayer molded layer (5) may be maximized, even in low pressure conditions, such as without autoclave molding. Furthermore, air that is trapped during layup and volatile components from the prepreg are released out of the prepreg using the flow of the matrix resin while at the same time the unimpregnated layer (6) inside the prepreg can be quickly impregnated with matrix resin, and the prepreg consolidation process can be completed. Furthermore, the fiber reinforced composite material obtained can simultaneously have a low void ratio and high impact resistance.

Furthermore, solid epoxy resins and novolac type epoxy resins, and combinations thereof are preferably used in the thermosetting resin composition for maintaining viscosity levels effective to preserve the permeability of the prepreg (and the laminate body constructed therefrom) until final cure. Examples of commercial solid type epoxy resins include Epon 1001F (manufactured by Momentive Performance Materials, Inc.), and Epon 3002 (manufactured by Momentive Performance Materials, Inc.), and the like. Examples of commercial novolac type epoxy resins include D.E.N 439 (manufactured by Dow Chemical), and the like. The amount of solid type epoxy resin, novolac resin, or combination thereof present in the thermosetting resin composition (component (B)) is preferably between about 5 and 40 weight parts, more preferably between 10 and 30 weight parts, and most preferably between 20 and 30 weight parts, per 100 parts of epoxy resin composition.

If the weight parts of solid type epoxy resin, novolac resin, or combination thereof is too low, the resin at room temperature could not withstand long out time processing or stable storage conditions due to possible moisture effects potentially reducing the resin viscosity further in the prepreg. The engineered air paths consequently may be closed off prematurely, leading to a high void ratio in the fiber reinforced composite material obtained. If the weight parts of solid epoxy resin are too high, prepreg processability can become compromised due to the increase of resin viscosity requiring significantly high process parameters; in addition, workability could also be lost due to brittleness of the resin.

Furthermore, the epoxide equivalent weight (EEW) of the solid type epoxy resin, novolac resin, or combination thereof in component (B) thermosetting resin composition may, in various embodiments of the invention, range from about 100 to about 800. If the EEW is too low for said epoxies, the resin may behave more like a liquid and may not produce a partially impregnated prepreg having good permeability levels when incorporated into a laminate body. If the EEW is too high for said epoxies, the resin flow could be restricted where the resin may not impregnate the fiber bed completely throughout cure, causing undesired void content. In addition, the processability of the prepreg could be difficult due to the higher resin viscosity obtained.

An epoxy resin having a softening point in the range of about 50° C. to about 125° C. is preferably used. Among such epoxy resins, solid epoxy resins and/or novolacs are preferable from the viewpoint of having an excellent balance of heat resistance and toughness; additionally, such thermosetting resins help improve resin flow characteristics. If the softening point of the epoxy resin is lower than 50° C., resin flow may be too high, which could compromise prepreg processability or which may lead to collapse of the permeable pathway(s) in a laminate body comprised of the partially impregnated prepreg. If the softening point of the epoxy resin is higher than 125° C., prepreg processability could be compromised due to the viscosity of the component (B) being too high.

In addition to the above-mentioned epoxy resins, other types of epoxy resins can be used in the thermosetting resin composition constituting component (B) of the present invention, provided they do not interfere with the ability to achieve partially impregnated prepregs having the desired characteristics (e.g., prepregs which can be laid up into laminate bodies having satisfactory permeability, even after the prepregs have experienced long out times, and which may be cured to provide fiber reinforced composite materials having <1% void ratios. For example, liquid and semi-solid epoxy resins (epoxy resins which are liquid or semi-solid at room temperature) may be utilized, in combination with the aforementioned solid epoxy resins, provided their content in component (B) is not so high as to compromise the permeability of the laminate body to an unacceptable extent. The liquid and semi-solid epoxy resins may be, for instance, liquid and semi-solid bisphenol A epoxy resins, liquid and semi-solid bisphenol F epoxy resins, liquid and semi-solid glycidyl amine based epoxy resins (e.g., Araldite MY9655, sold by Huntsman Advanced Materials, which is a tetraglycidyldiaminodiphenylmethane), and the like. Thermosetting resins other than epoxy resins may also be employed.

Most preferably, component (B) contains, in addition to thermosetting resin, at least one thermoplastic resin blended into and dissolved in the thermosetting resin, in order to provide improved effects such as enhancing the toughness of the matrix resin when cured and at the same time controlling the viscosity of the resin to improve prepreg permeability during prolonged out-time and storage conditions. Furthermore, the thermoplastic resin can be crystalline or amorphous. In particular, at least one type of thermoplastic resin is used which is selected from the group consisting of polyamides, polycarbonates, polyacetals, polyphenylene oxides, polyphenylene sulfides, polyarylates, polyesters, polyamideimides, polyimides, polyetherimides, polyimides with a phenyltrimethylindane structure, polysulfones, polyethersulfones, polyetherketones, polyetheretherketones, polyaramids, polyethernitriles, and polybenzimidazoles. These thermoplastic resins can be commercial polymers, or so-called oligomers with a lower molecular weight than commercial polymers.

A thermoplastic resin having a number average molecular weight of 10,000 to 70,000 g/mol is preferably used, more preferably 20,000 to 60,000 g/mol, and most preferably 40,000 to 60,000 g/mol. If the thermoplastic resin has an excessively low number average molecular weight, a prepreg may have excessive tack property thus compromising the handling properties of the prepreg. Furthermore, resin flow could be too high, which may collapse the permeable pathway in the partially impregnated prepreg. If a thermoplastic resin having an excessively high number average molecular weight is used, a prepreg may lose its tack property all together and thus handling properties are worsened or the prepreg may fail to be produced due to the viscosity of the resin being too high when the thermoplastic resin is dissolved in the thermosetting resin. Above all, when a thermoplastic resin having a number average molecular weight within the preferred range is used and dissolved in a thermosetting resin, a large amount of the thermoplastic resin can be incorporated as long as the prepreg process is not compromised. As a result, good resin flow, high toughness, and high tensile strength can be achieved in the cured fiber-reinforced composite material obtained.

Furthermore, the formulation amount of these thermoplastic resins in component (B) is preferably between 5 and 30 weight parts, more preferably between 10 and 25 weight parts, and most preferably between 10 and 23 weight parts, per 100 weight parts of thermosetting resin (e.g., epoxy resin). If the formulation amount of thermoplastic resin is too low, there is a possibility that toughness could be lost and, more importantly, that the permeability of the laminate body could be compromised by not having sufficient viscosity levels to maintain the air paths needed for long out time OOA processes. If the formulation amount of the thermoplastic resin is too high, toughness could be improved although processability could potentially be lost due to the significant increase in resin viscosity causing extreme processing conditions.

The initial viscosity at 30° C. of the thermosetting resin composition (component (B)) of the present invention is preferably between 20,000 and 140,000 Pa's and most preferably is between 20,000 and 130,000 Pa's, in order to maximize the permeability needed at room temperature of the laminate body to maintain long out time processing (for example, 20 days out time) and storage stability. If the viscosity at 30° C. is too low, there is a possibility resin flow could prematurely close off the air paths, causing high void content in the fiber reinforced composite material obtained; this would reduce the out time capability of the prepreg. If the viscosity at 30° C. is too high, improved permeability could be achieved, although resin flow may be restricted during cure and interfere with the consolidation process, thereby leading to high void content.

The minimum viscosity of the thermosetting resin composition (component (B)) of the present invention is measured in accordance with the procedure described in the Examples and is preferably between 0.1 and 15 Pa·s, more preferably between 0.3 and 10 Pa·s, and most preferably between 0.5 and 10 Pa·s. If the minimum viscosity is too low, the flow of the matrix resin could be too high causing the resin to bleed out of the laminate body during the cure process. Furthermore, there is a possibility that the desired resin fraction might not be achieved for the fiber reinforced composite material obtained, the flow of the matrix resin in the prepreg will be insufficient, and an undesirably high content of voids would be present in the fiber reinforced composite material obtained. If the minimum viscosity is too high, there is a possibility that the flow of the matrix resin in the prepreg will be low, causing the consolidation process of the laminate body to end early; this is likely to lead to a high void content in the fiber reinforced composite material obtained (compromising the mechanical properties of the composite material).

For the present invention, if excellent impact resistance in the cured fiber reinforced composite material is desired, particles or fibers of thermoplastic resin may be included as a component ("component (C)") of the prepreg in addition to component (B) (the thermosetting resin composition) and component (A) (the matrix of reinforcing fiber). The types of material that are used for the component (C) particles or fibers of thermoplastic resin in the present invention can be similar to the various types of thermoplastic resins previously described as the thermoplastic resin that may be blended and dissolved in the thermosetting resin composition. Of these, polyamides are most preferable for greatly increasing the impact resistance due to their excellent toughness. Among the polyamides, nylon 12, nylon 11, nylon 6, nylon 6/12 copolymer, and a nylon (semi-IPN nylon) modified to have a semi-IPN (interpenetrating polymer network) with an epoxy compound as disclosed in Example 1 of Japanese Patent Application Laid-open No. 1-104624 impart particularly good adhesive strength in combination with the epoxy resin, and nylon 6/12 copolymers impart particularly favorable adhesion strength to the (B) thermosetting resin composition. Furthermore, the weight of the (C) particles or fibers of thermoplastic resin is preferably 20 weight % or less with regards to the total weight of the prepreg and/or is preferably 1 weight % or more with regards to the total weight of the prepreg.

Furthermore, the presence of particles or fibers of the thermoplastic resin ("component (C)") could increase the resin viscosity when incorporated in the thermosetting resin composition (Component (B)). When the viscosity increases due to the addition of the particles, the thermosetting resin can potentially be retained more effectively towards the surface of the prepreg, thereby preventing the air pathways from closing prematurely. The weight of the (C) particles or fibers of thermoplastic resin is preferably between about 6 weight % to about 20 weight % with regards to the weight of thermosetting resin. Moreover, when the thermosetting resin has an initial viscosity ≥20000 Pa's, it is more preferred to employ a particle content ≥6 wt % (most preferably ≥8 wt %) and a particle content of <20 wt % to maintain resin on the surface of the prepreg, preventing the air pathways from closing off prematurely. If the formulation amount of thermoplastic particles is too low, there is a possibility that the air pathways could close and toughness could be lost. If the formulation amount of the thermoplastic particles is too high, toughness could be improved; however, processability could potentially be lost due to the significant increase in resin viscosity, causing extreme processing conditions.

The thermosetting resin composition (Component (B)) may and preferably does contain one or more hardeners capable of curing the thermosetting resin. The hardener for the epoxy resin can be any compound with an active group that can react with an epoxy group. Compounds with at least one amino group, acid anhydride group, or azide group are suitable as hardeners, for example. More specific examples of hardeners include various isomers of diamino diphenyl sulfone, amino benzoate esters, various types of acid anhydrides, phenol novolac resins, cresol novolac resins, polyphenol compounds, imidazole derivatives, aliphatic amines, tetramethyl guanidine, thiourea adduct amines, methylhexahydrophthalic anhydride, and other carboxylic acid anhydrides, carboxylic acid hydrazides, carboxylic acid amides, polymercaptans, and boron trifluoride ethylamine complexes, and other Lewis acid complexes and the like. These hardeners can be used individually or in combination.

By using an aromatic diamine as the hardener, a cured resin with favorable heat resistance can be obtained. In particular, various isomers of diamino diphenyl sulfone provide a cured resin with favorable heat resistance, and therefore are most suitable. The amount of aromatic diamine hardener that is added is preferably a stoichiometric equivalent amount (relative to the epoxy content of the epoxy resin) but in some cases, a cured resin with high modulus of elasticity can be obtained by using an equivalent ratio (hardener:epoxy) of approximately 0.7 to 1.0.

The glass transition temperature of the cured matrix resin influences the heat resistance of the fiber-reinforced composite material. It is preferred that the cured product of the epoxy resin composition of the present invention has a high glass transition temperature. Specifically, it is preferred that the glass transition temperature of the cured material obtained be at least 200° C.

In the preparation of the epoxy resin composition of the present invention, a kneader, planetary mixer, triple roll mill, twin screw extruder, and the like may advantageously be used. Where two or more epoxy resins are used, after the epoxy resins are placed in the equipment, the mixture is heated to a temperature in the range of from 50 to 200° C. while being stirred so as to uniformly dissolve the epoxy resins. During this process, other components, excluding the curing agent(s) (e.g., thermoplastic resin, inorganic particles), may be added to the epoxy resins and kneaded with them. Thereafter, the mixture is cooled down to a temperature of no more than 100° C. in some embodiments, while being stirred, followed by the addition of the curing agent(s) and kneading to disperse those components. This method may be used to provide a thermosetting resin composition with excellent storage stability.

Next, fiber reinforced plastics (FRP) materials (alternatively referred to herein as "fiber reinforced composite materials") are described. There are no specific limitations or restrictions on the type or types of reinforcing fiber used in the present invention, and a wide range of fibers, including glass fiber, carbon fiber, graphite fiber, aramid fiber, boron fiber, alumina fiber and silicon carbide fiber, may be used. Carbon fiber may provide FRP materials that are particularly lightweight and stiff. Carbon fibers with a tensile modulus of 180 to 800 GPa may be used, for example. If a carbon fiber with a high modulus of 180 to 800 GPa is combined with a thermosetting resin composition to provide a prepreg, a desirable balance of stiffness, strength and impact resistance may be achieved in the FRP material.

There are no specific limitations or restrictions on the form of reinforcing fiber, and fibers with diverse forms may be used, including, for instance, long fibers (drawn in one direction), tow, fabrics, mats, knits, braids, and short fibers (chopped into lengths of less than 10 mm). Here, long fibers mean single fibers or fiber bundles that are effectively continuous for at least 10 mm. Short fibers, on the other hand, are fiber bundles that have been chopped into lengths of less than 10 mm. Fiber configurations in which reinforcing fiber bundles have been aligned in the same direction may be suitable for applications where a high specific strength and specific modulus are required.

FRP materials of the present invention may be manufactured using methods such as the prepreg lamination and molding method, resin transfer molding method, resin film infusion method, hand lay-up method, sheet molding compound method, filament winding method and pultrusion method, though no specific limitations or restrictions apply in this respect. Of these methods, the prepreg lamination and molding method may be used to give excellent stiffness and strength to the FRP materials obtained.

Prepregs may contain embodiments of the thermosetting resin composition and reinforcing fibers. Such prepregs may be obtained by impregnating a reinforcing fiber base material with a thermosetting resin composition of the present invention. Impregnation methods include the wet method and hot melt method (dry method).

The wet method is a method in which reinforcing fibers are first immersed in a solution of a thermosetting resin composition, created by dissolving the thermosetting resin composition in a solvent, such as methyl ethyl ketone or methanol, and retrieved, followed by the removal of the solvent through evaporation via an oven, etc. to impregnate reinforcing fibers with the thermosetting resin composition. The hot-melt method may be implemented by impregnating reinforcing fibers directly with a thermosetting resin composition, made fluid by heating in advance, or by first coating a piece or pieces of release paper or the like with a thermosetting resin composition for use as resin film and then placing a film over one or either side of reinforcing fibers as configured into a flat shape, followed by the application of heat and pressure to impregnate the reinforcing fibers with the resin. The hot-melt method may give a prepreg having virtually no residual solvent in it.

The reinforcing fiber cross-sectional density of a prepreg may be 50 to 350 g/m². If the cross-sectional density is at least 50 g/m², there may be a need to laminate a small number of prepregs to secure the predetermined thickness when molding a FRP material and this may simplify lamination work. If, on the other hand, the cross-sectional density is no more than 350 g/m², the drapability of the prepreg may be acceptable. If the reinforcing fiber volume fraction is at least 50%, this may provide the advantage of a FRP material in terms of its excellent specific strength and specific modulus, as well as preventing the FRP material from generating too much heat during the curing time. If the reinforcing fiber volume fraction is no more than 80%, impregnation with the resin may be satisfactory, decreasing a risk of a large number of voids forming in the FRP material.

To apply heat and pressure under a prepreg lamination and molding method, a press molding method, autoclave molding method, vacuum bagging molding method, wrapping tape method, internal pressure molding method, or the like may be used as appropriate.

Autoclave molding is a method in which prepregs are laminated on a tool plate of a predetermined shape and then covered with bagging film, followed by curing, performed through the application of heat and pressure while air is drawn out of the laminate. It may allow precision control of the fiber orientation, as well as providing high-quality molded materials with excellent mechanical characteristics, due to a minimum void content. The pressure applied during the molding process may be 0.3 to 1.0 MPa, while the molding temperature may be in the 90 to 300° C. range.

The reinforcing fibers that are used in the prepreg of the present invention can be glass fibers, aramid fibers, carbon fibers, graphite fibers, or boron fibers or the like, as mentioned previously. Of these, carbon fibers are preferable from the perspective of specific strength and specific modulus.

With the prepreg of the present invention, the amount of reinforcing fibers per unit area is preferably between 100 and 310 g/m². If the amount of reinforcing fibers is low, the number of lamination layers required to obtain the desired thickness in the laminate body will need to increase, and the operation may become complex, but if the amount of reinforcing fibers is too high, the draping properties of the prepreg may be compromised.

The prepreg of the present invention preferably has a fiber weight content between 30% and 80%, more preferably between 40% and 70%, and most preferably between 50% and 65%. If the fiber weight content is too low, there is a possibility that the amount of matrix resin will be too high, and the advantages of a fiber reinforced composite material with excellent specific strength and specific modulus will not be achieved. If the fiber weight content is too high, improper impregnation could occur due to insufficient resin, and there is a possibility that a large number of voids will form in the fiber reinforced composite material obtained using the prepreg.

Furthermore, the laminate body of the present invention has a permeable pathway created by partially impregnating a thermosetting resin composition (component (B)) into a matrix of reinforcing fiber (component (A)) to provide a prepreg that is then used to form the laminate body. Permeability can be described as the state of a material (the laminate body) that causes it to allow gases (air) to pass through it. A relatively high degree of permeability could allow large and complex structures, for example, to exhibit high consistency in part quality such as low void content and could further improve out-time and storage stability. If the permeability of the laminate body is relatively low, longer process times may occur due to a longer time needed to remove entrapped air or volatiles during de-bulking, potentially causing inefficient manufacturing methods.

As previously mentioned, a laminate body prepared from the prepreg after 20 days out time at room temperature (23° C.) has a permeability (as measured using the procedure described in the Examples) of at least $4.0\text{E-}14$ m². Preferably, the permeability of the laminate body prepared from the prepreg after 20 days out time at room temperature is at least $5.0\text{E-}14$ m². More preferably, the permeability of the laminate body prepared from the prepreg after 20 days out time at room temperature is at least $6.0\text{E-}14$ m². To help ensure that full consolidation of the laminate body during curing takes place and the resulting fiber reinforced composite body has an advantageously low void ratio, it will be desirable for the permeability of the laminate body prepared from the prepreg after 20 days out time at room temperature to be no greater than $1.0\text{E-}13$ m². In other embodiments, the permeability of the laminate body prepared from the prepreg after 20 days out time at room temperature is no greater than $9.0\text{E-}14$ m².

Thus, in various embodiments of the present invention, the permeability of the laminate body prepared from prepreg that has experienced 20 days out time at room temperature is within one of the following ranges:

$4.0\text{E-}14$ m² to $1.0\text{E-}13$ m²

$5.0\text{E-}14$ m² to $9.0\text{E-}14$ m²

$6.0\text{ E-}14$ m² to $9.0\text{E-}14$ m²

The laminate body of the present invention preferably has an air permeability parameter at 24 hr vacuum time at or within a difference of $\leq 1.0\text{ E-}14$ m² between a laminate body prepared from prepreg with 0 day out time and a laminate body prepared from prepreg with 20 day out time, wherein the void ratio of said laminate body after cure is <1%. If the permeability of the prepreg used to prepare the laminate body is too low during the estimated time of 20 days needed to construct a large structure, for example, complete extraction of entrapped air and or volatiles during debulking and complete consolidation process during cure may not be achieved, leading to poor part quality and increased process times and therefore inefficient manufacturing methods. If permeability remains too high, insufficient consolidation of the laminate body could occur due to the resin flow not being adequate enough to completely wet out the fiber bed during cure, causing poor part quality and leading to inefficient manufacturing methods.

EXAMPLES

Certain embodiments of the present invention are now described in more detail by way of examples. The measurement of various properties was carried out using the methods described below.

Those properties were, unless otherwise noted, measured under environmental conditions comprising a temperature of about 23° C. and a relative humidity of about 50%.

The components used in examples and comparative examples are as follows.

(Carbon Fibers)

Torayca (registered trademark) T800S-24K-10E (carbon fibers manufactured by Toray Industries, Inc. with a fiber count of 24,000, tensile strength of 5.9 GPa, tensile elasticity of 290 GPa, and tensile elongation of 2.0%).

(Epoxy Resin)
Solid Bisphenol A type epoxy resin, Epon 1001F (manufactured by Momentive Performance Materials, Inc.), having an EEW of 550 g/eq and a softening point of 79° C.
Solid Bisphenol F type epoxy resin, Epon 3002 (manufactured by Momentive Performance Materials, Inc.), having an EEW of 590 g/eq and a softening point of 80° C.
Bisphenol A type epoxy resin, Epon 825 (manufactured by Momentive Performance Materials, Inc.).
Tetraglycidyldiaminodiphenylmethane, Araldite (registered trademark) MY9655 (manufactured by Huntsman Advanced Materials).
(Thermoplastic)
Polyethersulfone with a terminal hydroxyl group, Sumikaexcel (registered trademark) PES5003P (manufactured by Sumitomo Chemical Co., Ltd.), having a number average molecular weight of 47,000 g/mol.
(Hardener)
4,4'-diaminodiphenylsulfone, Aradur (registered trademark) 9664-1 (manufactured by Huntsman Advanced Materials).
(Additive)
TN fine particles (manufactured by Toray Industries, Inc.).
The following methods were used to characterize the thermosetting resin composition and the prepreg for each working example.

(1) Thermosetting Resin Composition Viscosity Measurement

A mixture was created by dissolving prescribed amounts of all the components other than the curing agent in a mixer, and then prescribed amounts of the curing agent were mixed into the mixture to obtain the epoxy resin composition.

Viscosity at 30° C. and the minimum viscosity are determined by the following methods.

The viscosity of the epoxy resin composition was measured using a dynamic viscoelasticity measuring device (ARES, manufactured by TA Instruments) using parallel plates while increasing the temperature at a rate of 2° C./min, with a strain of 10%, frequency of 0.5 Hz, and plate gap of 1 mm, and plate dimensions of 40 mm, from 30° C. to 170° C. In the present invention, viscosity refers to the complex viscoelastic modulus. Minimum viscosity can be calculated from a correlation curve of the temperature and the viscosity under the condition of rate of temperature increase at 2° C./min, a vibration frequency of 0.5 Hz, and a parallel plate (diameter 40 mm). Viscosity at 30° C. (referred to as initial viscosity) and minimum viscosity (referred to as highest resin flow point→most liquid state) can be obtained by the curve generated from the ARES device plot using the same parameters.

(2) Fiber Reinforced Composite Material Void Ratio Measurement

A cured composite article consisting of 12 plies of unidirectional prepreg in a [0°] structure with a laminate body 300 mm long and 150 mm wide was prepared. Three 25 mm long×25 mm wide sample pieces were cut from this laminate body, and the cross-section was polished, and then three photographs were taken of each piece for a total of nine photographs using an optical microscope at a zoom of 50× or higher such that the top and bottom surfaces of the laminate body fit within the viewing field. The surface area ratio of voids with regards to the cross-sectional area was calculated and the average void ratio was used as the void ratio.

Figure 3:
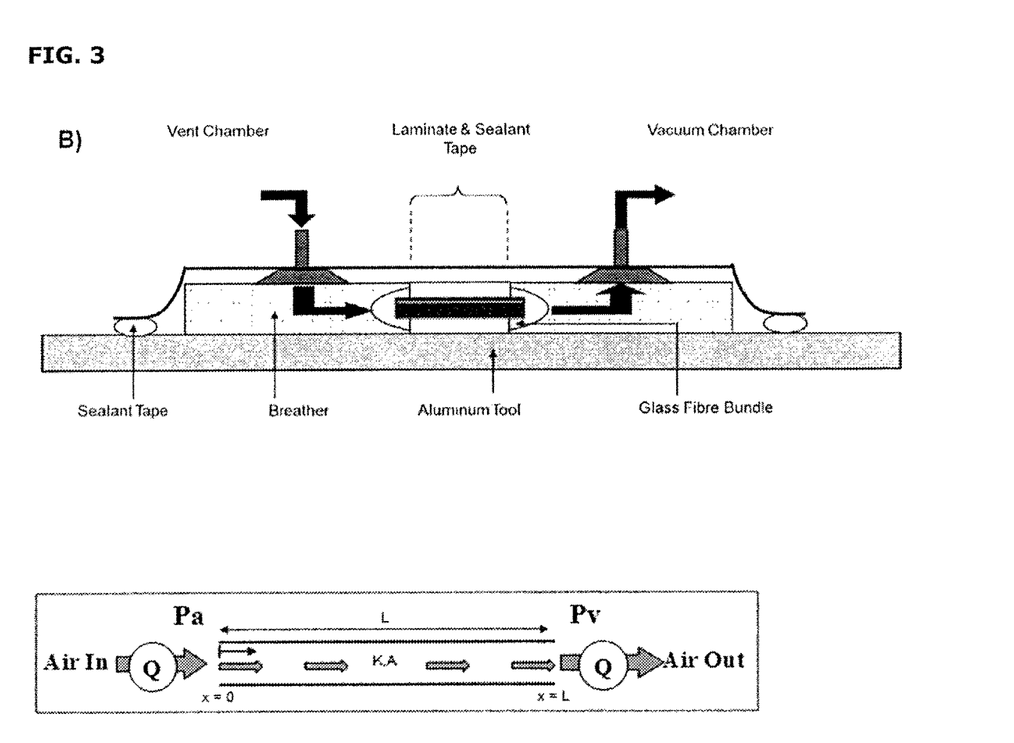
FIG. 3 is a schematic of the permeability test, which is described in more detail in the Examples.

(3) The following procedure is employed to measure the permeability of laminate bodies prepared using a plurality of prepregs. The permeability test measurement was performed in accordance with the procedures described in pages 36-48 of the master's thesis of Kevin Hsiao entitled "Gas Transport and Water Vapourization in Out-of-Autoclave Prepreg Laminates" (University of British Columbia 2012). Gas permeability in the in-plane and through-thickness directions were measured and the effects of processing conditions such as out time, storage, and vacuum conditioning times were documented. First, 4-8 plies of uni-directional prepreg were cut with a dimension of approximately 50 mm (w)×300 mm (l). Based on the desired nominal thickness (approximately 0.07 inches (1.8 mm)), plies were then laid up and consolidated at room temperature (ca. 23° C.) under vacuum at a level of about 95 kPa. Each sample was laid up such that two breathing edges remain exposed in the in-plane testing direction as shown in FIG. 3. The exposed edges were covered by glass fiber bundles and placed in contact with layers of breather and vacuum ports to form complete pathways for gas (air) removal and monitoring. The permeability tester was then checked for leaks. Thereafter, the test initiated and once steady-state flow was achieved, flow rate data was recorded at desired time intervals.

The test measures Q through the laminate stack and permeability K is calculated by Darcy's Steady State flow:

$$Q = \frac{AK}{2\mu L}\left(\frac{p_0^2 - p_L^2}{p_0}\right)$$

Where:
K [m$^2$] is Permeability
Q [m$^3$/s] is steady-state volumetric flow rate
μ [Pa*s] is the dynamic viscosity of air at room temperature
L [m] is sample length
A [m$^2$] is cross-sectional area
$P_0$ [Pa] is pressure in
$P_L$ [Pa] is pressure out Working Examples 1 and 2 and Comparative Examples 3 and 5

15 weight parts of PES5003P polyethersulfone (Comparative Example 3 and 5, 13 weight parts of PES5003P) were added and dissolved in 60 weight parts of Araldite (registered trademark) MY9655 and 40 weight parts (Comparative Example 5, 35 weight parts of Epon 825 and 5 weight parts of EP1001) of Epon 825 in a kneader, and then 45 weight parts of Aradur (registered trademark) 9664-1 were kneaded in as a hardener to produce a thermosetting resin composition (Component (B)).

The produced thermosetting resin composition (Component (B)) was applied onto release paper using a knife coater to produce two sheets of 52.0 g/m$^2$ resin film. Next, the aforementioned two sheets of fabricated resin film were overlaid on both sides of unidirectional oriented carbon fibers with a density of 1.8 g/cm$^2$ in the form of a sheet (T800S-12K-10E; Component (A)) and the resin was impregnated into the sheet of carbon fibers using a roller temperature of 130° C. and a roller pressure of 0.20 MPa (Comparative Example 3, roller temperature 110° C. and roller pressure 0.30 MPa) to produce a unidirectional prepreg with a carbon fiber area weight of 190 g/m$^2$ and a matrix resin weight fraction of 35%.

A laminate body (precursor to a fiber reinforced composite) was fabricated by laying up 12 plies of the aforementioned prepreg conditioned at 0 day out time and 20 day out time at room temperature and molded using a vacuum bag only process as defined below by placing it into a vacuum envelope and degassing for three hours at room temperature with a degree of vacuum of about 100 kPa. After degassing was complete the laminate body was brought from room temperature to 120° C. at a rate of 1.7° C./min and held at 120° C. for 120 minutes and then finally cured at a rate of 1.7° C./min to 180° C. for 120 minutes to provide a fiber reinforced composite.

In comparison to Comparative Example 3 and 5, the viscosity of the thermosetting resin composition is significantly higher resulting in higher air permeability to sustain longer out-time processes and storage stability without sacrificing the processability of the prepreg and the laminate body. Although Comparative Example 5 (without particles) shows a higher initial viscosity than Comparative Example 3 after 20 day out time, the void ratio still increased to 3%. More importantly, the air permeability between 0 day and 20 day out time was well maintained resulting in a void ratio less than 1% in the cured composite of Working Example 1-2. Comparative Example 3 also maintained air permeability between 0 day and 20 day out time, yet at a low level, resulting in a void ratio of 5%. The results obtained shown in Table 1.

Working Examples 2-4 and 7 and Comparative Examples 1-2 and 4

Prepregs and laminate bodies based on those prepregs were fabricated in a similar manner to working example 1 except that 20 weight parts of fine particles (Component (C)) were additionally present in admixture with the thermosetting resin composition (Component (B)). Comparative Examples 1-2 and 4 are similar to Comparative Example 3, other than the incorporation of 20 weight parts of fine particles. The fine particles are thermoplastic resin particles.

In comparison to Comparative Examples 1-2 and 4, the viscosity of the thermosetting resin compositions used in Working Examples 2-4 and 7 continued to significantly increase, resulting in higher air permeability in the resulting prepregs and laminate bodies. More importantly, the air permeability between 0 day and 20 day out time was well maintained, resulting in a void ratio less than 1% in the cured composite. On the other hand, Comparative Examples 1-2 showed low void ratios at 0 day out time, yet a significant decrease in air permeability after 20 day out time resulting in an increased void ratio of 3% in the cured fiber reinforced composite material. Comparative Example 4 maintained air permeability between 0 day and 20 day out time, yet at a low level, resulting in a void ratio up to 10% when the laminate body was cured. In addition, the compression strength and compression after impact of Working Example 4 maintained its mechanical strength similar to Comparative Examples 1-2. The results obtained are shown in Table 1.

Working Example 5

Prepreg was fabricated in a similar manner to Working Example 4 except that the prepreg was produced by single sided impregnation.

The produced thermosetting resin composition (Component (B) in admixture with Component (C)) was applied onto release paper using a knife coater to produce one sheet of 104.0 g/m$^2$ resin film. Next, the aforementioned sheet of fabricated resin film was overlaid on one side of unidirectionally oriented carbon fibers with a density of 1.8 g/cm$^2$ in the form of a sheet (T800S-12K-10E; Component (A)) and the resin was impregnated into the sheet using a roller temperature of 130° C. and a roller pressure of 0.20 MPa to produce a unidirectional prepreg with a carbon fiber area weight of 190 g/m$^2$ and a matrix resin weight fraction of 35%.

A laminate body (precursor to a fiber reinforced composite) was fabricated by laying up 12 plies of the aforementioned prepreg conditioned at 0 day out time and 20 day out time at ambient temperature and molded using a vacuum bag only process as defined below by placing it into a vacuum envelope and degassing for three hours at room temperature with a degree of vacuum of about 100 kPa. After degassing was complete, the laminate body was brought from room temperature to 120° C. at a rate of 1.7° C./min and held at 120° C. for 120 minutes and then finally cured at a rate of 1.7° C./min to 180° C. for 12b minutes to obtain a fiber reinforced composite material.

The viscosity of the thermosetting resin composition of the prepreg was kept similar to that of Working Example 4 while still maintaining sufficient air permeability between 0 day and 20 day out time, resulting in a void ratio less than 1% in the final cured composite for both conditions. The results obtained are shown in Table 1.

Working Example 6

Prepreg was fabricated in a similar manner to Working Example 4 but the resin content was increased to 38%. Similar to Working Example 4, the viscosity of the thermosetting resin composition of the prepreg was kept at a value effective to maintain sufficient air permeability between 0 day and 20 day out time while also still providing a cured fiber reinforced composite material having a void ratio of less than 1%. The results obtained are shown in Table 1. Higher resin content prepreg improved the quality of the final cured composite further without sacrificing processability.

Working Examples 8-9

10 (Working Example 8) and 25 (Working Example 9) weight parts of Epon 1001F were added into 60 weight parts of Araldite (registered trademark) MY9655, then 30 (Working Example 8) and 15 (Working Example 9) weight parts of Epon 825 were added in a kneader, and then 45 weight parts of Aradur (registered trademark) 9664-1 were kneaded into both resins as a hardener to produce, a thermosetting resin composition (Component (B)).

The viscosities of the thermosetting resins are relatively high, resulting in higher air permeability in the laminate bodies formed from the prepregs, thereby sustaining longer out-time processes and storage stability without sacrificing the processability of the prepreg and laminate body. More importantly, the air permeability between 0 day and 20 day out time at room temperature was well maintained, resulting in a void ratio of less than 1% in the cured fiber reinforced composite material. In addition, the compression strength and compression after impact for Working Example 8 maintained its mechanical strength in comparison to Comparative Example 1-2. The results obtained are shown in Table 1.

Working Examples 10-12

10 (Working Example 10), 20 (Working Example 11), and 30 (Working Example 12) weight parts of Epon 3002 were added into 60 weight parts of Araldite (registered trademark) MY9655 and 30 (Working Example 10), 20 (Working Example 11), and 10 (Working Example 12) weight parts of Epon 825 in a kneader, and then 45 weight parts of Aradur (registered trademark) 9664-1 were kneaded into all the resins as a hardener to produce a thermosetting resin composition (Component (B)).

The viscosities of the thermosetting resins are also relatively high, resulting in higher air permeability in the laminate bodies formed from prepregs impregnated with the thermosetting resin compositions, thus sustaining longer out-time processes and storage stability without sacrificing the processability of the prepregs and laminate bodies. More importantly, the air permeability between 0 day and 20 day out time was well maintained, resulting in a void ratio of less than 1% in the cured composite. In addition, the compression strength and compression after impact for Working Example 11 maintained its mechanical strength in comparison to Comparative Example 1-2. The results obtained are shown in Table 1.

TABLE 1

| | | | Unit | C.E 1 | C.E 2 | C.E 3 | C.E 4 | C.E 5 |
|---|---|---|---|---|---|---|---|---|
| Thermosetting resin (Component B) | Epoxy | MY9655T | (Weight Parts) | 60 | 60 | 60 | 60 | 60 |
| | | EPON825 | | 40 | 40 | 40 | 40 | 35 |
| | | Ep1001 | | 0 | 0 | 0 | 0 | 5 |
| | | Ep3002 | | 0 | 0 | 0 | 0 | 0 |
| | Curative | 4-4'DDS | | 45 | 45 | 45 | 45 | 45 |
| | Additive | PES5003P | | 13 | 13 | 13 | 13 | 13 |
| Thermoplastic particle (Component C) | Interlayer toughening material | PA | | 20 | 20 | 0 | 20 | 0 |
| Epoxy Resin Properties | Thermosetting resin viscosity at 30° C. | | (Pa · s) | 10511 | 10511 | 10511 | 10511 | 15080 |
| | Minimum viscosity of thermosetting resin | | (Pa · s) | 0.6 | 0.6 | 0.6 | 0.6 | 0.8 |
| Prepreg Properties | Impregnation S = Single sided D = Double sided | | — | D | D | D | D | D |
| | Resin content | | (wt %) | 35 | 35 | 35 | 35 | 35 |
| | Fiber areal weight | | (g/m$^2$) | 190 | 190 | 190 | 190 | 190 |
| | Air Permeability at 24 hr vacuum, 0 day | | m$^2$ | 4.6E-14 | 4.6E-14 | 1.1E-15 | 1.1E-15 | |
| | Air Permeability at 24 hr vacuum, 20 day | | m$^2$ | 3.4E-14 | 3.4E-14 | 1.0E-15 | 1.0E-15 | |
| | Air Permeability difference at 24 hr (0 day – 20 day) | | m$^2$ | 1.2E-14 | 1.2E-14 | 1.0E-16 | 1.0E-16 | |
| Fiber Reinforced Composite Material Properties | Void Ratio @ 0 day out-time | | (%) | 1.3 | 0.7 | 5.0 | 8.3 | 1.0 |
| | Void Ratio @ 20 day out-time | | | 3.0 | 3.0 | 5.0 | 10.0 | 3.0 |
| | *Compression Strength, 0 day | | (MPa) | 1385 | 1379 | | | |
| | Compression After Impact (CAI) @ 270 in-lb, 0 day | | (MPa) | 282 | 276 | | | |

| | | | Unit | Ex 1 | Ex 2 | Ex 3 | Ex 4 | Ex 5 | Ex 6 |
|---|---|---|---|---|---|---|---|---|---|
| Thermosetting resin (Component B) | Epoxy | MY9655T | (Weight Parts) | 60 | 60 | 60 | 60 | 60 | 60 |
| | | EPON825 | | 40 | 40 | 40 | 40 | 40 | 40 |
| | | Ep1001 | | 0 | 0 | 0 | 0 | 0 | 0 |
| | | Ep3002 | | 0 | 0 | 0 | 0 | 0 | 0 |
| | Curative | 4-4'DDS | | 45 | 45 | 45 | 45 | 45 | 45 |
| | Additive | PES5003P | | 15 | 15 | 18 | 21 | 21 | 21 |
| Thermoplastic particle (Component C) | Interlayer toughening material | PA | | 0 | 20 | 20 | 20 | 20 | 20 |
| Epoxy Resin Properties | Thermosetting resin viscosity at 30° C. | | (Pa · s) | 21404 | 21404 | 35747 | 59378 | 59400 | 59300 |
| | Minimum viscosity of thermosetting resin | | (Pa · s) | 1.0 | 1.0 | 1.6 | 2.5 | 2.5 | 2.5 |
| Prepreg Properties | Impregnation S = Single sided D = Double sided | | — | D | D | D | D | S | D |
| | Resin content | | (wt %) | 35 | 35 | 35 | 35 | 35 | 38 |
| | Fiber areal weight | | (g/m$^2$) | 190 | 190 | 190 | 190 | 190 | 190 |
| | Air Permeability at 24 hr vacuum, 0 day | | m$^2$ | 4.8E-14 | 5.3E-14 | 6.2E-14 | 7.1E-14 | 7.1E-14 | 7.2E-14 |
| | Air Permeability at 24 hr vacuum, 20 day | | m$^2$ | 5.2E-14 | 5.6E-14 | 6.6E-14 | 7.4E-14 | 7.4E-14 | 7.5E-14 |
| | Air Permeability difference at 24 hr (0 day – 20 day) | | m$^2$ | 4.0E-15 | 2.8E-15 | 4.4E-15 | 3.2E-15 | 3.2E-15 | 3.0E-15 |
| Fiber Reinforced Composite Material Properties | Void Ratio @ 0 day out-time | | (%) | 0.2 | 0.5 | 0.3 | 0.1 | 0.9 | 0.1 |
| | Void Ratio @ 20 day out-time | | | 0.2 | 0.6 | 0.3 | 0.1 | 0.9 | 0.1 |
| | *Compression Strength, 0 day | | (MPa) | | | | 1413 | | |
| | Compression After Impact (CAI) @ 270 in-lb, 0 day | | (MPa) | | | | 310 | | |

| | | | Unit | Ex 7 | Ex 8 | Ex 9 | Ex 10 | Ex 11 | Ex 12 |
|---|---|---|---|---|---|---|---|---|---|
| Thermosetting resin (Component B) | Epoxy | MY9655T | (Weight Parts) | 60 | 60 | 60 | 60 | 60 | 60 |
| | | EPON825 | | 40 | 30 | 15 | 30 | 20 | 10 |
| | | Ep1001 | | 0 | 10 | 25 | 0 | 0 | 0 |
| | | Ep3002 | | 0 | 0 | 0 | 10 | 20 | 30 |

TABLE 1-continued

|  |  |  |  |  |  |  |  |  |
|---|---|---|---|---|---|---|---|---|
|  | Curative | 4-4'DDS |  | 45 | 45 | 45 | 45 | 45 | 45 |
|  | Additive | PES5003P |  | 24 | 13 | 13 | 13 | 13 | 13 |
| Thermoplastic particle (Component C) | Interlayer toughening material | PA |  | 20 | 20 | 20 | 20 | 20 | 20 |
| Epoxy Resin Properties | Thermosetting resin vistosity at 30° C. | (Pa·s) | 75110 | 50705 | 126750 | 57362 | 114723 | 143000 |
|  | Minimum viscosity of thermosetting resin | (Pa·s) | 3.3 | 1.0 | 1.7 | 1.3 | 3.4 | 4.5 |
| Prepreg Properties | Impregnation S = Single sided D = Double sided | — | D | D | D | D | D | D |
|  | Resin content | (wt %) | 35 | 35 | 35 | 35 | 35 | 35 |
|  | Fiber areal weight | (g/m$^2$) | 190 | 190 | 190 | 190 | 190 | 190 |
|  | Air Permeability at 24 hr vacuum, 0 day | m$^2$ | 8.0E−14 | 7.0E−14 | 8.4E−14 | 6.0E−14 | 6.7E−14 | 7.3E−14 |
|  | Air Permeability at 24 hr vacuum, 20 day | m$^2$ | 8.6E−14 | 7.1E−14 | 8.2E−14 | 6.1E−14 | 6.5E−14 | 7.4E−14 |
|  | Air Permeability difference at 24 hr (0 day − 20 day) | m$^2$ | 6.2E−15 | 1.0E−15 | 2.0E−15 | 1.0E−15 | 2.1E−15 | 1.0E−15 |
| Fiber Reinforced Composite Material Properties | Void Ratio @ 0 day out-time | (%) | 0.2 | 0.5 | 0.3 | 0.6 | 0.4 | 0.2 |
|  | Void Ratio @ 20 day out-time |  | 0.2 | 0.5 | 0.3 | 0.6 | 0.5 | 0.2 |
|  | *Compression Strength, 0 day | (MPa) |  |  | 1344 |  | 1489 |  |
|  | Compression After Impact (CAI) @ 270 in-lb, 0 day | (MPa) |  |  | 303 |  | 296 |  |

*normalized to Vf = 60%

What is claimed is:

1. A partially impregnated prepreg configured to be laid up in multiple plies in a laminate body, the partially impregnated prepreg comprised of a component (A) comprising a matrix of reinforcing fiber and a component (B) comprising a thermosetting resin, wherein i) the matrix of reinforcing fiber is partially impregnated by component (B) and ii) the laminate body has a permeability of at least 4.0E-14 m$^2$ after an out time of 20 days at 23° C. and a void ratio after cure of <1%.

2. The partially impregnated prepreg according to claim 1, wherein the laminate body has a permeability of not greater than 1.0E-13 m$^2$.

3. The partially impregnated prepreg according to claim 1, wherein the laminate body satisfies the following condition:

$$P_{0day} - P_{20day} \text{ at 24 hr vacuum is } 1.0E\text{-}14 \text{ m}^2$$

wherein $P_{0day}$ is the permeability parameter of 0 day out time prepreg at 24 hr vacuum, and wherein $P_{20day}$ is the permeability parameter of 20 day out time prepreg at 24 hr vacuum, wherein the permeability difference of $P_{0day} - P_{20day}$ is 1.0E-14 m$^2$.

4. The partially impregnated prepreg according to claim 1, wherein component (B) has a viscosity at 30° C. of between about 20,000 and 140,000 Pa·s and a minimum viscosity of between about 0.1 and about 15 Pa·s.

5. The partially impregnated prepreg according to claim 1, wherein component (B) is additionally comprised of at least one thermoplastic resin dissolved in the thermosetting resin selected from the group consisting of polyvinyl formals, polyamides, polycarbonates, polyacetals, polyvinylacetals, polyphenyleneoxides, polyphenylenesulfides, polyarylates, polyesters, polyamideimides, polyimides, polyetherimides, polysulfones, polyethersulfones, polyetherketones, polyetheretherketones, polyaramids, polyethernitriles, polybenzimidazoles, derivatives thereof, and combinations thereof.

6. The partially impregnated prepreg according to claim 5, wherein the at least one thermoplastic resin has a number average molecular weight in the range of from about 10,000 to about 70,000.

7. The partially impregnated prepreg according to claim 5, wherein the thermoplastic resin of component (B) is present in component (B) in an amount which is 5-30 weight parts per 100 weight parts of the thermosetting resin.

8. The partially impregnated prepreg according to claim 1, wherein the thermosetting resin includes at least one epoxy resin selected from the group consisting of solid bisphenol A epoxy resins, a solid bisphenol F epoxy resins, and novolac epoxy resins, and combinations thereof.

9. The partially impregnated prepreg according to claim 8, wherein the epoxy resin or combination of epoxy resins has an EEW in the range of about 100 to about 800.

10. The partially impregnated prepreg according to claim 8, wherein the epoxy resin or combination of epoxy resins has a softening point in the range of about 50° C. to about 125° C.

11. The partially impregnated prepreg according to claim 8, wherein the epoxy resin or combination of epoxy resins is present in an amount which is 5-40 weight parts per 100 weight parts of the thermosetting resin.

12. The partially impregnated prepreg according to claim 1, wherein the prepreg is additionally comprised of a component (C) comprising a particle and/or fiber of thermoplastic resin.

13. The partially impregnated prepreg according to claim 12, wherein the particle and/or fiber of thermoplastic resin of component (C) is present in an amount of about 6 wt % to about 20 wt % based on the weight of the thermosetting resin.

14. The partially impregnated prepreg according to claim 12, wherein components (B) and (C) together represent from about 32% to about 45% of the total weight of the partially impregnated prepreg.

15. The partially impregnated prepreg according to claim 12, wherein the component (C) is substantially locally distributed on or near a surface of the prepreg.

16. The partially impregnated prepreg according to claim 1, wherein the prepreg comprises a first layer comprised of a portion of the thermosetting resin and a second layer comprised of the matrix of reinforcing fiber.

17. The partially impregnated prepreg according to claim 16, wherein the first layer is at or near a surface of the prepreg up to a depth of 20% from the surface.

18. The partially impregnated prepreg according to claim 1, wherein only one side of the prepreg is covered substantially by component (B).

19. The partially impregnated prepreg according to claim 1, wherein both sides of the prepreg are covered substantially by component (B).

20. The laminate body comprised of a plurality of partially impregnated prepregs in accordance with claim 1.

21. A fiber reinforced composite material comprising at least one laminate body in accordance with claim 20, wherein the laminate body has been thermally cured.

22. The fiber reinforced composite material of claim 21, wherein after the cure cycle, the void ratio is <1%.

23. A fiber reinforced composite material comprising at least one laminate body in accordance with claim 20, wherein the matrix of reinforcing fiber is unidirectional or has a fabric weave structure.

24. A method for manufacturing a fiber reinforced composite material, comprising molding the laminate body of claim 20 using a vacuum pump and oven.

25. A process for making a partially impregnated prepreg, comprising partially impregnating a component (A) comprising a matrix of reinforcing fiber with a component (B) comprising a thermosetting resin to form the partially impregnated prepreg, wherein component (B) is selected to have viscosity characteristics such that when the prepreg is laid up in multiple plies after an out time of 20 days at 23° C. to form a laminate body, the laminate body has a permeability of at least 4.0E-14 $m^2$ and the void ratio of the laminate body after cure is <1%.

26. A partially impregnated prepreg, comprising a component (A) comprising a matrix of reinforcing fiber and a component (B) comprising a thermosetting resin, wherein component (A) is partially impregnated by component (B) and wherein component (B) comprises an amount of one or more epoxy resins which are solid at 30° C. and/or an amount of at least one thermoplastic resin dissolved in the thermosetting resin which is or are effective to impart to component (B) a viscosity at 30° C. of between about 20,000 and 140,000 Pa•s and a minimum viscosity of between about 0.1 and about 15 Pa•s.

27. A process for making a fiber reinforced composite material, comprising the steps of a) laying up a plurality of plies of prepreg to obtain a laminate body and b) curing the laminate body to obtain the fiber reinforced composite material, wherein the prepreg comprises a partially impregnated prepreg comprised of a component (A) comprising a matrix of reinforcing fiber and a component (B) comprising a thermosetting resin, wherein i) the matrix of reinforcing fiber is partially impregnated by component (B) and ii) the partially impregnated prepreg, when laid up in multiple plies after an out time of 20 days at 23° C., provides a test laminate body having a permeability of at least 4.0E-14 $m^2$ and a void ratio after cure of <1%.

28. A process for making a fiber reinforced composite material, the process comprising:
   i) forming a laminate body having a permeability of at least 4.0E-14 $m^2$ after an out time of 20 days at 23° C. by laying up a plurality of plies of prepreg, each ply comprising a partially impregnated prepreg comprised of a component (A) including a matrix of reinforcing fiber and a component (B) including a thermosetting resin, wherein the matrix of reinforcing fiber is partially impregnated by component (B); and
   ii) curing the laminate body to obtain a fiber reinforced composite material having a void ratio after cure of <1%.

* * * * *